United States Patent
Kuiper et al.

(10) Patent No.: US 12,463,519 B2
(45) Date of Patent: Nov. 4, 2025

(54) OPTICAL ELEMENT EXCHANGE UNIT

(71) Applicant: Nederlandse Organisatie voor toegepast-natuurwetenschappelijk onderzoek TNO, s-Gravenhage (NL)

(72) Inventors: Stefan Kuiper, 's-Gravenhage (NL); Martin Paul Alfred Kooper, Rotterdam (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 353 days.

(21) Appl. No.: 17/580,806

(22) PCT Filed: Jul. 24, 2020

(86) PCT No.: PCT/NL2020/050486
§ 371 (c)(1),
(2) Date: Jan. 21, 2022

(87) PCT Pub. No.: WO2021/015621
PCT Pub. Date: Jan. 28, 2021

(65) Prior Publication Data
US 2023/0318427 A1  Oct. 5, 2023

(30) Foreign Application Priority Data
Jul. 24, 2019 (EP) .................... 19188188

(51) Int. Cl.
*H02K 41/03* (2006.01)
*G02B 7/00* (2021.01)
*G02B 26/00* (2006.01)

(52) U.S. Cl.
CPC ........... *H02K 41/033* (2013.01); *G02B 7/006* (2013.01); *G02B 26/008* (2013.01); *H02K 2201/15* (2013.01)

(58) Field of Classification Search
CPC ........... H02K 1/14; H02K 1/16; H02K 1/165; H02K 1/17; H02K 1/18; H02K 1/185;
(Continued)

(56) References Cited

U.S. PATENT DOCUMENTS 3,999,107 A    12/1976   Reuting
4,315,171 A *   2/1982   Schaeffer ............... H02K 41/03
                                                    310/49.53
(Continued)

FOREIGN PATENT DOCUMENTS

CN    104793310 A *   7/2015   ............. G02B 7/006
CN    107508400 A *   12/2017   ............... H02K 1/28
(Continued)

OTHER PUBLICATIONS

17580806_Feb. 22, 2024_CN_104793310_A_H.pdf (Year: 2024).*
(Continued)

*Primary Examiner* — Christopher M Koehler
*Assistant Examiner* — Ahmed F Seck
(74) *Attorney, Agent, or Firm* — Banner & Witcoff, Ltd.

(57) ABSTRACT

An optical element exchange unit, has a rotatable wheel e.g. with different filters. The wheel has first soft magnetic teeth protruding from a soft magnetic part of the wheel at even angular offset along at least part of a ring around a rotation axis of the wheel. The optical element exchange unit has a stator comprising a first soft magnetic yoke, the first soft magnetic yoke having poles with a first group and second group of at least one second soft magnetic tooth respectively, the second soft magnetic teeth of the first and second group protruding from the poles of the first soft magnetic yoke towards the first soft magnetic teeth and a second soft magnetic yoke, the second soft magnetic yoke having poles with a third group and fourth group of at least one second soft magnetic tooth respectively, the second soft magnetic
(Continued)

teeth of the third and fourth group protruding from the poles of the second soft magnetic yoke towards the first soft magnetic teeth. A permanent magnet is magnetically coupled between parts of the first and second soft magnetic yoke. The teeth of the first, second, third and fourth groups are positioned so that, when each tooth of the first group is aligned with its nearest first soft magnetic tooth, each second soft magnetic tooth of the second group is halfway the angular offset between its nearest first soft magnetic teeth, and the second soft magnetic teeth in the third and fourth group are less than half the angular offset in opposite directions from their nearest first soft magnetic teeth.

14 Claims, 2 Drawing Sheets

(58) Field of Classification Search
CPC ...... H02K 15/02; H02K 15/03; H02K 15/085; H02K 21/10; H02K 21/14; H02K 21/24; H02K 21/28; H02K 23/04; H02K 23/08; H02K 23/10; H02K 29/06; H02K 41/033; H02K 41/031; H02K 41/02; H02K 41/025; H02K 41/03; H02K 49/10; H02K 2201/15; G02B 7/00; G02B 7/003; G02B 7/005; G02B 7/006; G02B 7/02; G02B 7/021; G02B 7/027; G02B 7/04; G02B 7/14; G02B 7/16; G02B 7/20; G02B 7/24; G02B 7/38; G02B 7/40; G02B 26/00; G02B 26/001; G02B 26/007; G02B 26/008; G02B 26/023; G02B 26/02; G02B 26/06; G02B 27/00; G02B 27/005; G02B 27/0062; G02B 5/0294; G02B 5/0883; G02B 5/20; G02B 5/205; G02B 5/208; G02B 5/22; G02B 5/26; G02B 5/28; G02B 6/02052; G02B 6/2861; G02B 6/29361; G02B 6/29362; G02B 6/29364; G02B 6/29365; G02B 6/29368; G02B 6/2937; G02B 6/29389; G02B 6/3532; G02B 2006/12109; G02B 13/0075; G02B 13/0065; G02B 27/646
See application file for complete search history.

(56) References Cited

U.S. PATENT DOCUMENTS

| | | | |
|---|---|---|---|
| 4,683,391 A | 7/1987 | Higuchi | |
| 4,823,062 A * | 4/1989 | Hoffman | G05B 19/25 318/687 |
| 5,887,334 A * | 3/1999 | Dooris | H02K 41/03 29/609 |
| 7,148,590 B1 * | 12/2006 | Lampson | H02K 41/03 310/12 |
| 2006/0061896 A1 | 3/2006 | Belousova et al. | |
| 2008/0030108 A1 * | 2/2008 | Trago | H02K 37/20 310/49.01 |
| 2008/0074008 A1 * | 3/2008 | Lin | H02K 37/18 310/156.64 |
| 2008/0225240 A1 | 9/2008 | Chang et al. | |
| 2008/0278694 A1 | 11/2008 | Wu et al. | |
| 2010/0013327 A1 * | 1/2010 | Hoppe | H02K 1/06 310/12.25 |
| 2010/0259112 A1 * | 10/2010 | Chung | H02K 16/00 310/12.18 |
| 2014/0049124 A1 * | 2/2014 | Gandhi | H02K 15/03 310/46 |
| 2015/0295456 A1 * | 10/2015 | Michaelides | H02K 41/031 310/156.01 |
| 2017/0102515 A1 * | 4/2017 | Du | G02B 7/006 |

FOREIGN PATENT DOCUMENTS

| | | |
|---|---|---|
| DE | 2209084 A1 | 9/1972 |
| DE | 102014203305 A1 | 8/2015 |
| EP | 0581612 B1 | 3/1997 |
| EP | 1887678 A2 | 2/2008 |
| GB | 492644 A | 9/1938 |
| JP | H08191563 A | 7/1996 |

OTHER PUBLICATIONS

17580806_Feb. 22, 2024_CN_107508400_A_H.pdf (Year: 2024).*
International Search Report and Written Opinion—PCT/NL2020/050486—mailing date Sep. 23, 2020.
Bozzo et al. "The Filter Wheel and Filters development for the X-IFU instruments on-board Athena"—Department of Astronomy, University of Geneva.
Holmes et al., "A Filter Wheel Mechanism for the Euclid Near-Infrared Imaging Photometer", SPIE Astronomical Telescopes + Instrumentation, 2010, San Diego, California, United States.
Szabo et al., Hybrid Linear Stepper Motors, Technical University of Cluj, Romania, Electrical Machines Department, 1998.
Gibson et al., "Life-Test Investigation and Status of the NIRISS Dual Wheel Cryogenic Mechanism for JWST" 2013.

* cited by examiner

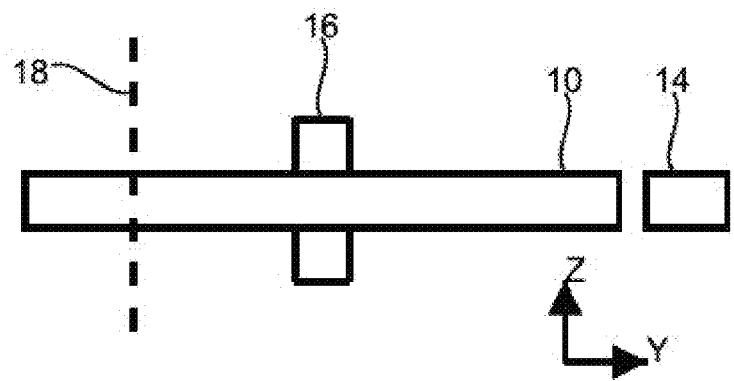
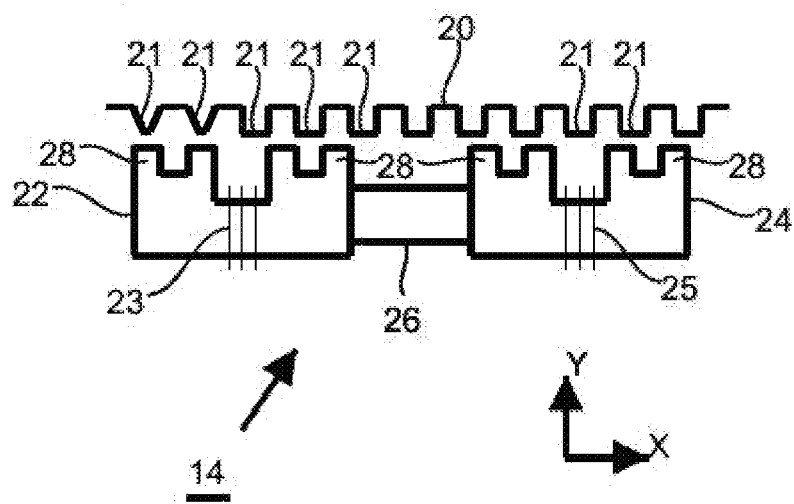

OPTICAL ELEMENT EXCHANGE UNIT

CROSS-REFERENCE TO RELATED APPLICATIONS

This application is a U.S. National Stage application under 35 U.S.C. § 371 of International Application PCT/NL2020/050486 (published as WO 2021/015621 A1), filed Jul. 24, 2020, which claims the benefit of priority to Application EP 19188188.7, filed Jul. 24, 2019. Benefit of the filing date of these prior applications is hereby claimed. Each of these prior applications is hereby incorporated by reference in its entirety.

FIELD OF THE INVENTION

The invention relates to an optical element exchange unit with a motor driven wheel.

BACKGROUND ART

A motor driven optical filter wheel is described in an article by E. Bozzo et al, titled "The Filter Wheel and Filters development for the X-IFU instruments on-board Athena" published in Proceedings of the SPIE, 2016, Paper No. 9905-189. A filter wheel contains a plurality of parallel optical filters in different radial sectors from the rotation axis of the wheel. Such a filter wheel is used in an optical system wherein the optical axis of the light path intersects the wheel in a direction transverse to the radial plane of the wheel, with an offset from the rotation axis, so that different filters can be made to intersect the optical axis, according to the rotation of the wheel. During use, the wheel is rotated between different stationary positions wherein different filters intersect the optical axis.

The article by Bozzo et al drives the rotation by a stepper motor and a gear system to couple the motor to the wheel. The gear system is centered on the axis of the wheel, and the stepper motor is placed next to the gear system. The stepper motor and a gear system lie within the radius from the rotation axis of the wheel to the parts of the edges of the optical filters that lie closest to the rotation axis of the wheel. The radius of the wheel is substantially determined by a second radius from the rotation axis of the wheel to the parts of the edges of the optical filters that lie furthest from the rotation axis of the wheel.

Stepper motors usually contain a permanent magnet, usually an axial permanent magnet in the rotor, with teeth protruding radially from the north and south pole of the axial permanent magnet towards teeth on electromagnets on the stator. Apart from its function in driving movement, such a permanent magnet has the additional advantage that it can serve to hold the filter wheel in position when no current is supplied to the stepper motor. In some environments, such as environments with sensitive electronics or in satellites whose orientation can be affected by magnetic fields in space, the use of a permanent magnet can lead to problems. Fortunately, stepper motors can be made small, so that these problems can be minimized. A disadvantage is that the use of the gear system between the stepper motor and the filter wheel gives rise to wear.

U.S. Pat. No. 4,683,391 discloses an actuator with a stator with a magnetic core member with teeth pairs on successive poles. The magnetic core member forms a pair of pole groups, each group with two poles, so as to provide magnetic field components in opposite directions toward the rotor. First coils are provided around the individual poles. Each group is provided with a second coil around the base of both poles of the group so as to provide magnetic field components in the same direction toward the rotor. The electric currents through the different first coils of the poles of the same group are used respectively to reinforce and cancel magnetic fields due to the second coils of the group.

GB492644 discloses a synchronous AC inductor motor with a stator that includes two groups of salients, wherein the salients act as poles with teeth towards the stator. Coils are provided around the individual salients, configured to supply ninety degrees out of phase current to salients of the different groups. Permanent magnetic inserts connecting salients of adjacent pairs from the same group. These permanent magnets are used to create a constant uniform flux in a flux circuit through the rotor between neighboring salients of adjacent pairs. The polarity of the permanent magnets is chosen so that the polarity of the constant uniform flux of the salients within the pair of the same group is the same. The permanent magnets make it possible to reduce the required number of salients.

DE 2209084 discloses a small size electromotor for watches. The motor comprises a stator with units that contain two magnetic cores and permanent magnets between the cores. Each core has two poles with teeth towards the rotor and a gap between these poles. A coil is provided to create opposite fluxes in adjacent poles of the two cores, to force the total magnetic field in one core to go through the gap rather than to the rotor, and to reinforce the field towards the rotor from the other core. This superimposes an AC modulation on a bias flux due to the permanent magnets.

SUMMARY

Among others, it is an object to provide for a motor driven optical element exchange unit with less wear.

An optical element exchange unit is provided, comprising
a rotatable wheel, with at least two optical elements in or on the wheel, positioned so that different ones of the optical elements will be moved to intersect an optical axis of the optical element exchange unit by rotating the wheel, the wheel comprising first soft magnetic teeth protruding from a soft magnetic part of the wheel at even angular offset along at least part of a ring around a rotation axis of the wheel;
a stator comprising
a first soft magnetic yoke, the first soft magnetic yoke having poles with a first group and second group of at least one second soft magnetic tooth respectively, the second soft magnetic teeth of the first and second group protruding from the poles of the first soft magnetic yoke towards the first soft magnetic teeth;
a second soft magnetic yoke, the second soft magnetic yoke having poles with a third group and fourth group of at least one second soft magnetic tooth respectively, the second soft magnetic teeth of the third and fourth group protruding from the poles of the second soft magnetic yoke towards the first soft magnetic teeth;
wherein the teeth of the first, second, third and fourth groups are positioned so that, when each tooth of the first group is aligned with its nearest first soft magnetic tooth, each second soft magnetic tooth of the second group is halfway the angular offset between its nearest first soft magnetic teeth, and the second soft magnetic teeth in the third and fourth group are less than half the angular offset in opposite directions from their nearest first soft magnetic teeth;

a permanent magnet, magnetically coupled between parts of the first and second soft magnetic yoke.

In this way small stator unit may provide both for a static hold force and for driving a rotation force exerted directly on the wheel, without requiring a gear transmission to transmit rotation to the wheel. The optical element exchange unit may have more than one optical axis, so that more than one of the optical elements can be moved to intersect the optical axes at the same time.

The magnetic coupling with the permanent magnet between parts of the first and second soft magnetic yoke, and hence between the first and second soft magnetic yoke as a whole, has the effect that the permanent magnet effectively separates the flux paths of the variable fluxes in the first and second soft magnetic yoke, in addition to providing a bias flux for holding the wheel in position. This simplifies the way in which current may be applied.

Preferably, first teeth are provided at all circumferential locations around the rotation axis of the wheel. This makes any rotation possible, but if only a limited range of rotation is needed first over a more limited circumferential range may suffice. The entire wheel may be of soft magnetic material, but it suffices that a part of the wheel through which magnetic flux flows between the first teeth is of soft magnetic material. The first teeth may protrude from the surface of the wheel, or be at least partly buried, in non soft magnetic material. As single ring of teeth may suffice, but alternatively more than one ring may be used, facing different groups of second teeth.

In an embodiment only said first and second soft magnetic yoke provide for driving rotation of the wheel. No other magnetic yokes are needed for this. Using only said first and second soft magnetic yoke to drive rotation reduces weight requirements and the need for more magnetic fields that could disturb measurements.

Preferably, no permanent magnetic flux is applied to the first teeth other than permanent flux generated by said permanent magnet. This minimizes stray fields that could disturb electronics or orientation of a satellite.

In an embodiment the first teeth protrude radially from a rim of the wheel, and the second teeth protrude radially towards the rim of the wheel. This minimizes local axial forces on the wheel that could increase wear.

In an embodiment the radial distance from the rotation axis of the wheel to the ring exceeds a maximal radial distance from the rotation axis of the wheel. Thus the first teeth and the yokes can be located radially outside the optical elements, where there is ample space and a low force can be used to create a relatively high torque on the wheel.

In an embodiment, the first and second teeth form protruding ridges on the wheel and the first and second soft magnetic yoke, the ridges extending in a direction transverse to the direction of protrusion of the teeth. Preferably the ridges extend perpendicularly to the direction of rotation.

In an embodiment, at least a part of the first soft magnetic teeth have in a pointed cross section protruding from the soft magnetic part of the wheel, with a relatively broader width nearer their base on the wheel and a narrower top further from their base. This provides for more accurate positioning, preferably a triangular cross-section. In a further embodiment all first teeth have the same pointed cross-section.

In an embodiment a part of the first soft magnetic teeth having a relatively narrower top width is located in ranges of angular positions where the second soft magnetic teeth face the wheel when respective ones of the optical elements intersect the optical axis respectively, and a further part of the first soft magnetic teeth located in between these ranges of angular positions have a relatively narrower top width. This provides for a combination of relatively smooth rotation and relatively more accurate holding positions.

Preferably, the optical element exchange unit comprises a first and second coil around the first and second soft-magnetic yoke respectively. Each coil may be configured to change a magnetic flux through its respective soft-magnetic yoke (from one pole of the yoke to the other) when an electric current is supplied through the coils. A coil only at a single location around the yoke may suffice. A current supply control circuit may be provided, configured to supply electric current pulses electric current pulses alternately through the first and second coils.

A satellite is provided comprising the optical element exchange unit. The wear and magnetic field properties of the unit address problems that occur in a satellite, such as the difficulty of maintenance and disturbance due to magnetic fields.

A method of rotating optical elements into an optical path, using the optical element exchange unit, by applying electrical current pulses alternately through coils around the first and second soft-magnetic yoke respectively. In an embodiment the electrical current pulses are used to rotate the wheel between different stationary positions wherein different optical filters intersect the optical axis respectively, the wheel being kept in place at the different stationary positions by a holding force created by distributing the flux from one pole of the permanent magnet over the teeth of the first and second group and distributing the flux from the opposite pole of the permanent magnet over the second teeth of the third and fourth group, while no electric current is applied to coils on first and second soft magnetic yoke. Thus no electric current in the optical element exchange unit is needed while the optical elements are kept at a stationary position during use of the optical elements.

BRIEF DESCRIPTION OF THE DRAWING

These and other objects and advantageous aspects will become apparent from a description of exemplary embodiments, with reference to the following figures.

FIG. 2 shows a rotor-stator configuration

DETAILED DESCRIPTION OF EXEMPLARY EMBODIMENTS

Figure 1:
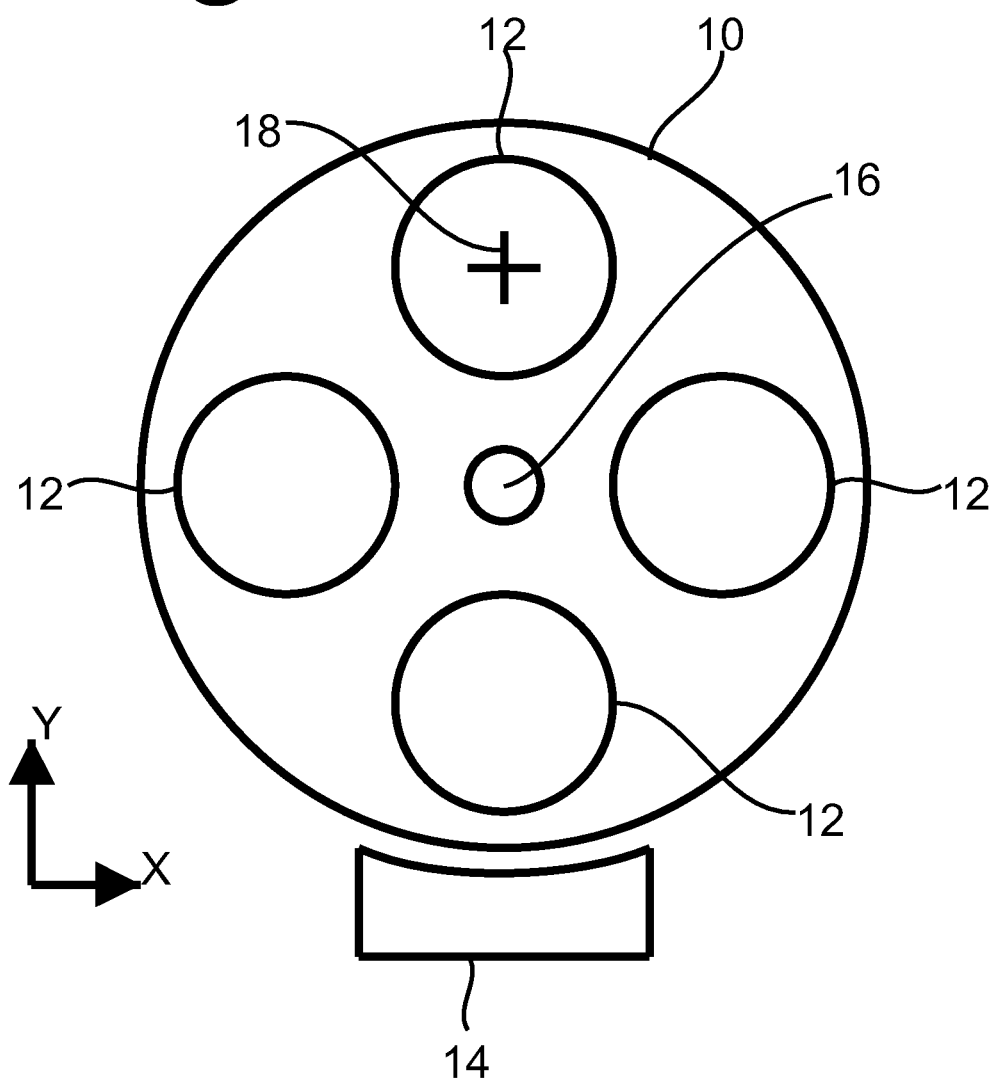
FIG. 1, la show an optical element exchange unit

FIG. 1 shows an optical element exchange unit with a wheel 10 viewed in projection along the axial direction of the wheel 10. FIG. 1*a* shows the optical element exchange unit in projection along a radial direction of the wheel 10. The axial direction is indicated as the z-direction and the directions perpendicular to the z-direction as indicated as the x and y direction. As shown, the wheel 10 may be a flat wheel, with a surface normal to the axial (z) direction. Alternatively, at least one of the surfaces many be at least partly conical, with a slope relative to the z-direction, e.g. with a circular or polygonal cross section at intermediate radial distances between the axis and the rim of the wheel.

By way of example an optical element exchange unit in the form of a filter unit is shown, for exchanging the optical filter 12 that is located in an optical path of the filter unit. In this example, the optical elements are filters (e.g. color selection filters, color blocking filters, wavelength band filters, polarizing filters, combinations of such filters, filters that select a combination of a color and a polarizations). Optionally one or more apertures (openings in the wheel) or light blockers (non-transparent parts of the wheel) may be included among the filters at one or more positions along the filter wheel.

Instead of a filter wheel, the optical elements on wheel 10 may include lenses, polarization rotators, depolarizers etc. Generally, optical element exchange unit has at least two optical elements in or on the wheel, positioned so that different ones of the optical elements will be moved to intersect an optical axis of the optical element exchange unit by rotating the wheel. The optical axis may be part of a light path to an optical detector (not shown) or from a light source (not shown) in an optical system of which the optical element exchange unit is a part. Although FIG. 1 shows an embodiment wherein the optical path passes through wheel 10, it should be appreciated that, instead, a wheel with reflecting optical elements may be used, such as plain mirrors, filtering mirrors, reflection lenses, reflecting polarization rotators, depolarizers etc., so that the optical path returns from wheel 10.

The filter unit comprises a filter wheel 10, a plurality of optical filters 12 and a stator unit 14. Filter wheel 10 is mounted rotatably around a rotation axis 16 that is directed along the axis of along filter wheel 10. The filter wheel may be fixed to a rotation shaft that is coupled to the frame via bearings, or the filter wheel may be fixed to a bearing that couples the wheel to a shaft that is fixed to frame, for example. The rotation shaft and the stator unit 14 may be coupled to a common frame (not shown) allowing filter wheel 10 to rotate in the frame and keeping stator unit 14 fixed in the frame. The filter unit is part of an optical arrangement wherein light is passed along a light path with an optical axis 18. Optical filters 12 are mounted in or on filter wheel 10. Optical axis 18 intersects the wheel in a direction transverse to the radial plane of the wheel, with an offset from the rotation axis. Optical filters 12 may be planar filters, with the surface planes of optical filters 12 parallel to a radial plane of filter wheel 10 (a plane perpendicular to the rotation axis), and the optical path may run through optical filters 12. Alternatively, the surface normal of one or more of optical filters 12 may be at an angle between ninety and zero degrees to the rotation axis of filter wheel 10, and/or reflective filters may be used.

During use, the wheel is rotated around rotation axis 16, between different stationary positions wherein different optical filters 12 intersect optical axis 18 respectively. This may be done by rotating the wheel by a predetermined number of rotation steps, or by measuring the rotational position of the wheel and applying rotation steps until it is measured that a position has been reached wherein a selected optical element has been moved into the optical path.

FIG. 2 schematically shows stator unit 14 along the rim 20 of the filter wheel. As used herein, the word rim refers to a radially outer part of wheel 10, radially outside the optical elements. The rim may be form an integral part of the wheel of the same material as the remainder of the wheel, or it may be of a different material. For the ease of drawing rim 20 is shown along a straight line, although in fact of course rim 20 will run along a circle. The filter wheel is provided with a ring of first soft magnetic first teeth 21 protruding from a soft magnetic part of the wheel at even angular offset along the ring, with the first teeth 21 protruding in the radial direction. The ring is concentric with rotation axis 16. Preferably, first teeth 21 are provided full circle along the ring, so that N first teeth 21 are provided, the angular offset between successive first teeth 21 is three hundred and sixty degrees divided by N. In an embodiment a spacing between successive teeth of at least 40% or 60% of the angular offset may be used. However, it should be noted that it may not be necessary to provide first teeth 21 full circle along the ring, e.g. rotation to only a limited range of rotational positions is needed.

The first teeth 21 may have the form of protruding ridges that extend along the axial direction of the filter wheel. Alternatively, the ridges may extend obliquely in a direction that has non-zero components in both the circumferential and axial directions of filter wheel 10. Although ridges with a rectangular cross-section are shown, other cross sections may be use, e.g. rounded or with side walls at a non-zero angle to each other.

To provide for accurate holding of the position of wheel 10 in the absence of electric current through coils 23, 25, the top width of at lease some of the teeth is preferably narrow in the radial direction, compared to the angular offset between successive teeth. Pointed teeth with a triangular cross section (optionally filleted) may be used for example, e.g. with a top angle of less than ninety and preferably forty five degrees or less. On the other hand, to provide for smooth motion of the wheel, teeth with a broad top width are preferable, e.g. with a rectangular or trapezoidal cross section, optionally filleted.

In an embodiment a combination of teeth with a relatively broader and narrower top width may be used on wheel 10, with teeth with narrower top width (e.g. as measured at 90% of the height of the teeth) in ranges of positions where the teeth of stator unit 14 face the wheel when an optical elements are in the optical path and broader teeth in between such ranges of positions. This provides for a combination of accurate holding and smooth motion. In a further embodiment, the teeth on stator unit 14 may have a top width in between those of the narrower and broader teeth on wheel 10.

The narrow, or relatively narrower teeth may have a width of less than 20% or 10% of the angular offset, at height above 90% of the teeth height for example. The broad, or relatively broad teeth may have a width of more than 20% or 40% of the angular offset, at the height above 90% of the teeth height.

At least a part of the filter wheel at rim 20, including the first teeth 21 and a part of the wheel that connects the teeth is of soft magnetic material. The requirement that at least a part of filter wheel is of soft magnetic material does not exclude that all of filter wheel 10 is of soft magnetic material. Soft magnetic material is a material that will assume a ferromagnetic polarization in a direction dependent on an external magnetic field to which the material is exposed, as distinguished from permanently magnetic material, wherein the polarization direction is permanent. The slots between the ridges may be left open, or at least partly filled with another material.

Stator unit 14 comprises a first soft magnetic yoke 22, a second magnetic yoke 24 and a permanent magnet 26 magnetically coupled between first and second soft magnetic yoke 22, 24 (more specifically coupled between the horizontal part of first soft magnetic yoke 22 and the horizontal part of second soft magnetic yoke 24, but instead permanent magnet 26 may connect other parts of first and second soft magnetic yoke 22, 24). A first and second electric conductor coil 23, 25 are wound around first and second soft magnetic yoke 22, 24 respectively, so that first soft magnetic yoke 22 and first electric conductor coil 23 form a first electromagnet and second soft magnetic yoke 24 and second electric conductor coil 25 form a second electromagnet.

First soft magnetic yoke 22 has a first and second pole, each with second soft magnetic teeth 28 protruding towards the teeth on rim 20 of the filter wheel. The second soft magnetic teeth 28 on the first pole of first soft magnetic yoke 22 are substantially at the same angular offset to each other as the first teeth 21 on rim 20. The same goes for the second soft magnetic teeth 28 on the second pole of first soft magnetic yoke 22. Like rim 20 first soft magnetic yoke 22 is shown along a straight line for the ease of drawing, although in fact it will follow the circle shape of rim 20. Second soft magnetic yoke 24 has similar a pole and second soft magnetic teeth 28 arrangement like that of first soft magnetic yoke 22. Because rim 20 is shown along a straight line, first and second soft magnetic yoke 22, 24 are shown in line as well, but in fact first and second soft magnetic yoke 22 will be at an angle to each other to follow the circle shape of rim 20.

The teeth on the different poles and on first and second soft magnetic yoke 22, 24 on stator unit 14 are positioned relative to each other in a configuration that is known per se for the moving part of linear stepper motors know as Sawyer motors. In linear motors, the Sawyer motor has the advantage that a permanent magnet and drive coils need only be provided on the (small) moving part of the linear motor. For rotors such an arrangement is not suitable because it requires current supply to the moving part. The angular spacing of the teeth within each pole corresponds to the angular spacing of the first teeth 21 on rim 20, but the position of the second teeth 28 on each pole relative to the position of the second teeth 28 on the other poles is configured to produce different phase relations on the poles with respect to rim 20. Herein the phase refers to the relative angular positions of the first teeth 21 on rim 20 with respect to the angular positions of the second teeth 28 on a pole of first and second soft magnetic yoke 22, 24. When the second teeth 28 on a pole have the same angular positions as the nearest first teeth 21 on rim 20 they are said to be in phase. The second teeth 28 on a pole are said to be in opposite phase to the first teeth 21 on rim 20 when the angular positions of the second teeth 28 on the pole are midway between the angular positions of the nearest first teeth 21 on rim 20.

The second teeth 28 on each of first and second soft magnetic yoke 22, 24 are positioned so that when the second teeth 28 on one of its poles are in phase with the first teeth 21 on rim 20, the second teeth 28 on the other pole of the same soft magnetic yoke are in opposite phase. In other words, the angular offset between the closest second teeth 28 on the different poles of the same soft magnetic yoke is an odd number times half the angular offset between the first teeth. First and second soft magnetic yoke 22, 24 are positioned relative to each other so that when the second teeth 28 on the yokes of first soft magnetic yoke 22 are in phase and in opposite phase respectively, the second teeth 28 on both poles of second soft magnetic yoke 22 are positioned midway between in phase and opposite phase positions. In other words, the angular offset between the closest second teeth 28 on different yokes is a number of times half the angular offset between the first teeth 21, plus a part of the angular offset between the first teeth 21, preferably a quarter of that angular offset.

Although an embodiment is shown wherein each pole of each yoke has a plurality of second teeth 28, a single second tooth 28 per pole may suffice. Thus, first soft magnetic yoke 22 runs from a first group of one or more second teeth 28 to a second group of one or more second teeth 28, arranged so that each second tooth 28 of the first group is aligned with its nearest first tooth 21 on rim 20 when each second tooth 28 of the second group is midway its nearest first teeth 28 on rim 20. Second soft magnetic yoke 24 runs from a third to a fourth group of one or more second teeth 28 that have a similar arrangement relative to each other as the first group and second group. But the second teeth 28 in the third and fourth group are each located with each second tooth 28 at less than half the angular offset between the first teeth 21 on rim 20 to the left and right of their nearest teeth on rim 20 respectively, when the second teeth 28 of the first group are aligned with their nearest first teeth 21 on rim 20.

Permanent magnet 26 creates magnetic circuits through first and second soft magnetic yoke 22, 24 and rim 20. When no electric current is applied to coils 23, 25 on first and second soft magnetic yoke 22, 24, permanent magnet 26 creates a magnetic circuit from permanent magnet 26 via first soft magnetic yoke 22, rim 20 and second soft magnetic yoke 24. First soft magnetic yoke 22 distributes the flux from one pole of the permanent magnet over the teeth of the first and second group. Similarly, second soft magnetic yoke 24 distributes the flux from the opposite pole of the permanent magnet over the second teeth 28 of the third and fourth group.

This creates a holding force that keeps rim 20 stationary at a local minimum energy position with the teeth of one of the groups aligned with their nearest teeth on rim 20. The teeth of the other group that is coupled to the same soft magnetic yoke, being located midway the nearest teeth on the stator, will exert no net force on rim 20 along the angular direction, and the teeth in the groups coupled to the other soft magnetic yoke, being located on opposite sides of the nearest teeth on rim 20, will exert equal forces on rim in opposite radial directions. Even if the opposite forces are not exactly equal and/or the net force is not exactly zero a local minimum energy position will occur, wherein the total of the forces from all groups is balanced.

The optical elements may be used while the wheel is kept in place at the different stationary positions, for example to perform optical measurements on light passed along the optical path through one of the optical elements, or to transmit an optical beam the optical path through one of the optical elements. No electric current needs to be applied to coils on first and second soft magnetic yoke during such use of an optical element.

The optical element exchange unit comprises a current supply control circuit (not shown) coupled to coils 23, 25 for supplying electric current to coils. When an electric current is applied through one of the coils 23, 25 on one of first and second soft magnetic yoke 22, 24, this affects the distribution of flux between groups of teeth that are coupled by that soft magnetic yoke. This causes a change in the force balance. When current is applied to the coil 23, 25 on the soft magnetic yoke between the groups that exert forces in opposite angular directions, a net force arises to bring the teeth of the group that receives more flux closer to the nearest teeth on rim 20.

When electric current pulses are applied alternately to coils 23, 25, this causes rim 20 rotate so that alternately teeth in the flux path of first and second soft magnetic yoke 22, 24 will be aligned with their nearest teeth on rim 20 (e.g. successively teeth of the first, third, second and fourth group). In addition to creating the holding force, permanent magnet 26 also has the effect that it effectively separates the flux circuits of the variable flux created by the current pulses are through coils 23, 25. This reduces variable flux effects on first soft magnetic yoke 22 due to variable current through coil 25 located on second soft magnetic yoke 24 and vice versa. The direction of rotation depends on the polarity of the current pulse. The current supply control circuit may be configured to supply current pulses that result in rotation in the same direction alternately to coils 23, 25, so that rotation over a number of rotation steps is realized. The current supply control circuit may have a command input for receiving a command indicating a required number of steps and the direction of the steps, and it may be configured to control the polarity of the pulses and the number of pulses in response to reception of the command.

In this way a single, permanent magnet that is much smaller than the filter wheel and two small electromagnets suffices to drive rotation of the filter wheel directly by means of current pulses through coils 23, 25 and to keep the filter wheel in place when no electric current is supplied to coils 23, 25. As the stator unit drives the filter wheel directly, a gear transmission is not needed. Preferably, no gear transmission coupled to the filter wheel is used. The filter wheel is particularly suitable for a satellite that comprises a filter unit, because it avoids using permanent magnets of the same size as the filter wheel. Preferably, only two magnetic yokes are used to drive the rotation, e.g. only first and second soft magnetic yoke 22, 24. In an embodiment no permanent magnetic flux is applied to the teeth on wheel 10 other than permanent flux generated by permanent magnet 26. Preferably, no further yokes or permanent magnets other than first and second magnetic yoke 22, 24 and permanent magnet 26, are magnetically coupled to teeth on wheel 10. This minimizes magnetic fields in the environment of wheel 10.

As may be noted, the flux from permanent magnet 26 preferably flows to one of first and second soft magnetic yoke 22, 24 via the part of that soft magnetic yoke 22, 24 around which a coil 23, 25 is present and to the other pole without the part of that soft magnetic yoke 22, 24 around which a coil 23, 25 is present. This suffices to redistribute flux. Alternatively, more than one coil may be provided on the same yoke, and flux from permanent magnet 26 may flow to both first and second soft magnetic yoke 22, 24 via parts of the soft magnetic yoke 22, 24 around which respective coils are present. In this case currents in both coils may be used to control redistribution of the flux, e.g. by generating oppositely directed fields with the respective coils.

The current supply control circuit may be configured to select a predetermined number of rotation steps according to an optical element that is currently in the optical path and an optical element that has to be moved into the optical path. In an embodiment, the optical element exchange unit comprises a position sensing arrangement (not shown) configured to measure the rotational position of wheel 10. In this case the current supply control circuit may be configured to continue causing rotation steps until the position sensing arrangement indicates that a selected optical element has been moved into the optical path. Any suitable position sensing arrangement may be used, e.g. an arrangement with optical markings on wheel 10. It may suffice to determine the amount of rotation by counting units of angular rotation, e.g. with periodic optical markings or a magnetic sensor that measures a magnetic effect of teeth that pass the sensor.

Although a configuration has been discussed wherein the teeth on rim 20 of filter wheel 10 protrude radially from rim 20, and the teeth on the poles of first and second soft magnetic yoke 22, 24 protrude radially from rim 20 towards the teeth on rim 20 in the opposite direction, it should be appreciated that other configurations are possible. For example, the teeth on rim 20 may be located in a ring on the surface of filter wheel that is perpendicular to the rotation axis of the filter wheel, protruding in the axial direction of the wheel (i.e. the x, Y directions of FIG. 2 may be replaced by the y and z direction). The protruding teeth may have the form of ridges that extend in the radial direction of the wheel, or obliquely to the radial direction. In these embodiment first and second soft magnetic yoke 22, 24 may have teeth protruding in the opposite direction to the direction in which the teeth on the filter wheel protrude. First and second soft magnetic yoke 22, 24 may have teeth protruding in a direction with an angle of between zero and ninety degrees with the rotation axis.

In another embodiment, more than one ring of teeth may be provided on rim 20, for example a first and second ring of teeth that protrude axially in mutually opposite directions from opposite radial surfaces of the filter wheel, or a first of teeth that protrude radially from rim and a second ring of teeth that protrude axially. In such embodiments, the poles of first and second soft magnetic yoke 22, 24 may have teeth in the opposite direction towards the teeth of the first and second ring respectively and/or the poles of first soft magnetic yoke 22 may teeth facing teeth of the first and second ring of teeth on the filter wheel respectively, for which purpose first soft magnetic yoke 22 may run around rim 20 of the filter wheel. The same may apply to second soft magnetic yoke 24.

Use of poles facing opposite surfaces of filter wheel 10 has the advantage that asymmetric normal load on the filter wheel is reduced. However, use of radially protruding teeth is preferred top minimize asymmetric normal load on the filter wheel.

Preferably, the teeth lie radially outside the optical elements on the wheel. Generally, all the optical elements lie between a first and second radial distance from the axis of rotation, with an innermost edge of at least one of the optical elements (e.g. filters) at the first radial distance and an outermost edge of at least one of the optical elements at the second radial distance. The teeth on the wheel preferably lie at a radial distance from the rotation axis that is larger than the second radial distance. In another embodiment, the teeth on the wheel lie at a radial distance from the rotation axis that is smaller than the first radial distance, i.e. nearer to the rotation axis than the optical elements. In this embodiment, the stator unit is also located nearer to the rotation axis. In this embodiment the yokes may need to be more complicated, e.g. to pass around the wheel, or to pass through the rotation shaft.

The invention claimed is:

1. An optical element exchange unit, comprising:
    a rotatable wheel, with at least two optical elements in or on the wheel, positioned so that different ones of the optical elements will be moved to intersect an optical axis of the optical element exchange unit by rotating the wheel, the wheel comprising first soft magnetic teeth protruding from a soft magnetic part of the wheel at an even angular offset along at least part of a ring around a rotation axis of the wheel;
    a stator comprising:
    a first soft magnetic yoke, the first soft magnetic yoke having poles with a first group and second group of second soft magnetic teeth respectively, the second soft magnetic teeth of the first and second group protruding from the poles of the first soft magnetic yoke towards the first soft magnetic teeth;
    a second soft magnetic yoke, the second soft magnetic yoke having poles with a third group and fourth group of second soft magnetic teeth respectively, the second soft magnetic teeth of the third and fourth group protruding from the poles of the second soft magnetic yoke towards the first soft magnetic teeth;
    wherein the teeth of the first, second, third and fourth groups are positioned so that, when each second soft magnetic tooth of the first group is aligned with its nearest first soft magnetic tooth, each second soft magnetic tooth of the second group is halfway the angular offset between its nearest first soft magnetic tooth, and the second soft magnetic teeth of the third and fourth group are less than half the angular offset in opposite directions from their nearest, respective, first soft magnetic teeth;

a permanent magnet, magnetically coupled between parts of the first and second soft magnetic yoke, wherein a part of the first soft magnetic teeth having a relatively narrower top width is located in ranges of angular positions where the second soft magnetic teeth face the wheel when respective ones of the optical elements intersect the optical axis respectively, and a further part of the first soft magnetic teeth located in between these ranges of angular positions have a relatively broader top width.

2. The optical element exchange unit according to claim 1, wherein only said first and second soft magnetic yoke are provided to drive rotation of the wheel.

3. The optical element exchange unit according to claim 1, wherein no permanent magnetic flux is applied to the first soft magnetic teeth other than permanent flux generated by said permanent magnet.

4. The optical element exchange unit according to claim 1, wherein the first soft magnetic teeth protrude radially from a rim of the wheel, and the second soft magnetic teeth protrude radially towards the rim of the wheel.

5. The optical element exchange unit according to claim 1, wherein a radial distance from the rotation axis of the wheel to the ring exceeds a maximal radial distance from the rotation axis of the wheel.

6. The optical element exchange unit according to claim 1, wherein the first soft magnetic teeth on the wheel and the second soft magnetic teeth on the first and second soft magnetic yokes are formed as ridges that protrude in a direction transverse to an elongation direction of the ridges.

7. The optical element exchange unit according to claim 1, wherein at least a part of the first soft magnetic teeth have in a pointed cross section protruding from the soft magnetic part of the wheel, with a relatively broader width nearer their base on the wheel and a narrower top further from their base.

8. The optical element exchange unit according to claim 1, wherein the optical elements are optical filters.

9. The optical element exchange unit according to claim 1, comprising first and second coils around the first and second soft-magnetic yoke respectively, configured to change a magnetic flux through the first and second soft-magnetic yoke respectively by electric current through the coils.

10. The optical element exchange unit according to claim 9, comprising a current supply control circuit coupled to the coils, configured to supply electric current pulses alternately through the first and second coils.

11. The optical element exchange unit according to claim 10, wherein the current supply control circuit is configured to keep the wheel at different stationary positions wherein different optical filters intersect the optical axis respectively, by ceasing electric current application to the coils around the first and second soft magnetic yoke.

12. A satellite comprising an optical element exchange unit according to claim 1.

13. A method of rotating optical elements into an optical path, using an optical element exchange unit according to claim 1, the method comprising applying electrical current pulses alternately through coils around the first and second soft-magnetic yoke respectively.

14. A method of rotating optical elements into an optical path according to claim 13, wherein the electrical current pulses are used to rotate the wheel between different stationary positions wherein different optical filters intersect the optical axis respectively, the wheel being kept in place at the different stationary positions by a holding force created by distributing the flux from one pole of the permanent magnet over the first and second group of second soft magnetic teeth and distributing the flux from the opposite pole of the permanent magnet over the third and fourth group of second soft magnetic teeth, while no electric current is applied to coils around the first and second soft magnetic yoke.

* * * * *